(No Model.)
J. C. HOLLOWAY & J. FREY.
SCOURING, GRINDING, POLISHING, AND SMUTTING COMPOSITION.
No. 417,866. Patented Dec. 24, 1889.
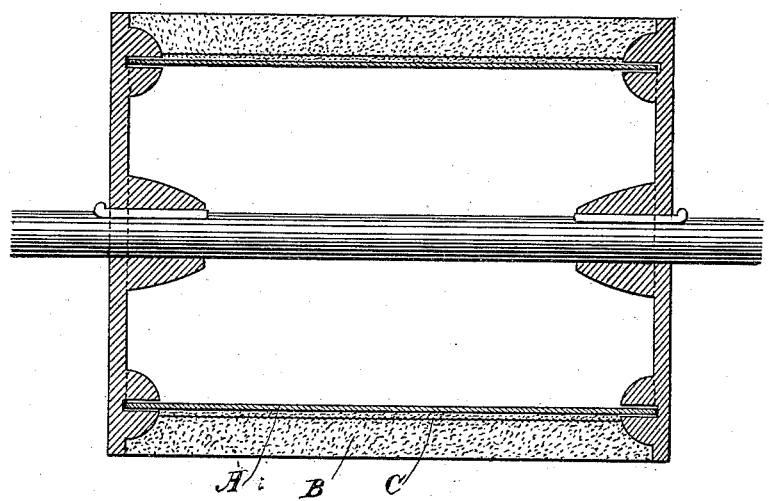

United States Patent Office.

JAMES C. HOLLOWAY AND JOHN FREY, OF SAN FRANCISCO, CALIFORNIA.

SCOURING, GRINDING, POLISHING, AND SMUTTING COMPOSITION.

SPECIFICATION forming part of Letters Patent No. 417,866, dated December 24, 1889.

Application filed December 11, 1888. Serial No. 293,291. (No specimens.)

*To all whom it may concern:*

Be it known that we, JAMES C. HOLLOWAY and JOHN FREY, of the city and county of San Francisco, State of California, have invented an Improvement in Smutting, Scouring, Polishing, and Grinding Compositions; and we hereby declare the following to be a full, clear, and exact description of the same.

Our invention relates to a new and useful composition of matter the general object of which is to grind, and the particular object is for use in machines for smutting, scouring, and polishing grain.

Our composition of matter consists of the following ingredients, combined in the proportions stated, namely: pulverized marble, twenty-five pounds; granulated silica, seventy-five pounds; glue, twenty-two and a half pounds; liquid extract of leaves or other portions of eucalyptus tree, two and a half pounds. The general proportions in which these ingredients are mixed and the method of preparing the composition are as follows: We first take three parts of the granulated silica and one of the pulverized marble and mix them together thoroughly. We then take the glue and after dissolving it subject it to a boiling-heat. Then we allow it to cool for about two minutes, when we add to it the liquid extract of eucalyptus in quantities sufficient to render the mass of a ropy consistency. We then take the mixed silica and marble and add to it so much of the mixed glue and eucalyptus extract as will reduce the whole mass to a doughy consistency, or until it assumes a brittle character.

The figure illustrates the application of our invention to a light iron cylinder.

Referring to the drawing, A is a light iron cylinder. B is the layer or coating of our composition, and C is a wire-gauze jacket around the cylinder and separated therefrom to serve as a bond for the composition.

For use in machines for smutting, scouring, and polishing grain, we apply the mixture to the circumference of a light iron cylinder until it is coated to a thickness of about one inch or one and a quarter inch. This cylinder is then placed in an oven and allowed to remain for about twelve hours under a high degree of heat. It is then taken out, and while the coating is still hot and its pores are open we pour over it some of the liquid extract of eucalyptus until the composition refuses to absorb any more of said extract, the cylinder being revolved during the application and until this extra coating or supply of extract is dried. This last application of extract of eucalyptus we find of importance in this use, as it completely fills up the pores of the composition and renders the absorption of moisture impossible, and the solidity of the whole composition is increased.

The pulverized marble used in the composition performs the office of filling up the spaces between the grains of silica, rendering it more compact, and, further, absorbing the mixture of extract of eucalyptus and glue to such an extent as to render it practically part of the same material.

The marble is of a very soft nature, compared with that of silica, but when mixed and baked with the other ingredients it becomes hard, and owing to its thorough amalgamation with the extract of eucalyptus and glue forms with them a perfectly solid mass, which adheres readily and with great tenacity to the particles of silica, holding them in position until worn away by the friction of the grain.

The silica used in the composition is crushed or ground to the proper size necessary for the work to be performed, and in some localities it is found crushed, naturally, sufficiently small to perform certain kinds of work. The function of the silica in the composition is to act as a cutting or grinding surface of a frictional nature, the other material serving as a bond for holding the particles of silica together, and being of a softer nature it wears away more rapidly, leaving the sharp edges and points of the silica particles projecting from the composition, which thus by friction operate to effect the result desired. Thus the surface of the composition is continually sharp, as the softer mass wears away faster, leaving the silica particles projecting.

The eucalyptus is a genus of tree of the natural order "myrtaceae," natives of Australia, but successfully introduced into California and Europe. The trees yield an extract which has at once a gummy, oily, and acid nature. This extract of eucalyptus may be obtained in any suitable manner from the leaves or such other portions of the tree as may be found useful for this purpose in this composition. Being of an oily nature, it resists and prevents the absorption of moisture. Its gummy character gives it cohesive properties and causes it to mix readily with and adds to the strength of the glue, while its acid property serves to turn the whole into a sticky, ropy, fibery mass, having great cohesive properties. The glue serves the purpose of thoroughly binding the whole together.

Having thus described our invention, what we claim as new, and desire to secure by Letters Patent, is—

The composition of matter herein described, consisting of the following ingredients, to wit: pulverized marble, granulated silica, glue, and the liquid extract of eucalyptus, combined in the proportions and in the manner substantially as hereinbefore described.

In witness whereof we have hereunto set our hands.

JAMES C. HOLLOWAY.
JOHN FREY.

Witnesses:
S. H. NOURSE,
H. C. LEE.